Patented Oct. 9, 1945

2,386,403

UNITED STATES PATENT OFFICE 2,386,403

POLYMERIZED CHLOROPRENE COMPOSITIONS

Alexander D. Macdonald, Malden, and James H. Rishton, Wakefield, Mass., assignors to B. B. Chemical Co., Boston, Mass., a corporation of Massachusetts No Drawing. Application April 7, 1941, Serial No. 387,266

3 Claims. (Cl. 260—5)

This invention relates to polymerized chloroprene and more particularly to liquid adhesive compositions prepared from plastic polymers of chloroprene.

Plastic polymerized chloroprene is chloroprene (also known as chloro-2-butadiene-1,3) which has been partially polymerized, and is plastic in the sense that it may be worked on the rolls of a rubber mill and compounded with other ingredients in a manner similar to that in which crude rubber is treated. Such plastic polymerized chloroprene may be "cured" or "vulcanized" to a condition in which it is elastic rather than plastic, and in which condition it resembles vulcanized rubber. This "curing" is probably a further polymerization of the partially polymerized chloroprene to a substantially fully polymerized condition rather than the addition of sulphur to the polymer, such as is considered to occur in the vulcanization of rubber.

For certain purposes, for example, where a polymerized chloroprene adhesive is to be used from time to time in shoe repair shops for the occasional attaching of outsoles to shoe uppers, it is desirable that the liquid adhesive be stable for relatively long periods of time. Furthermore, it is desirable that the adhesive composition contain all of the compounding ingredients that may be desired for the particular purpose in order that it may not be necessary to mix ingredients just prior to each use of the adhesive. Ordinarily, it is desired that such liquid adhesive contain curing ingredients so that the polymerized chloroprene content thereof will in due course become sufficiently cured to provide an adhesive bond capable of withstanding the usage under a variety of conditions to which shoes are subjected in ordinary wear.

We have found in our experience that a liquid polymerized chloroprene composition containing curing ingredients, and of considerable stability, may be prepared if the concentration of the polymerized chloroprene in the liquid composition is made sufficiently low, for example in the neighborhood of 1 pound of polymerized chloroprene to a gallon of composition, or less. However, liquid compositions with such low concentrations of plastic polymerized chloroprene are generally unsatisfactory for adhesive purposes because they are so fluid and watery in character that their application to the surfaces to be cemented is difficult to control and, furthermore, in the case of somewhat porous material, such as leather, the composition penetrates or dives into the leather to such an extent that it disappears from sight, thus requiring an excessive number of applications of the adhesive.

In view of the above considerations, an object of the invention is to provide an improved polymerized chloroprene liquid adhesive composition and method of preparing same. A further object is to provide a liquid adhesive composition containing a relatively low concentration of polymerized chloroprene and yet having sufficient body or viscosity so that it may be applied in controlled manner to a surface and without excessive penetration into porous materials.

In pursuance of the above and other objects, we have found that the viscosity of a liquid adhesive composition containing polymerized chloroprene may be substantially increased by incorporating therein emulsified water. The water is thus present in the form of a water-in-oil emulsion wherein the dispersed phase is water and wherein the continuous phase may comprise an organic liquid, preferably of the aromatic hydrocarbon type, for example, toluene. An emulsifying agent which has been found particularly suitable for maintaining the water in emulsified condition is chlorinated rubber, available commercially as "Tornesit." A preferred composition thus comprises a colloidal dispersion wherein the continuous phase contains an organic liquid of the aromatic hydrocarbon type and wherein there is a dispersed phase containing polymerized chloroprene and a dispersed phase containing water. Compounding ingredients of the usual type may also be contained in a dispersed phase. A preferred manner of preparing a polymerized chloroprene liquid composition containing emulsified water involves the dispersion of the polymerized chloroprene in solvent material, and the incorporation in such dispersion of an emulsion of water in an organic liquid of the aromatic hydrocarbon type.

Compositions in accordance with this invention are advantageous in that they may contain a relatively low concentration of polymerized chloroprene and yet have sufficient body or viscosity to make them useful for adhesive purposes. Moreover, the thickening material, water, is not only cheap and non-toxic, but it evaporates reasonably rapidly without leaving a residue and does not adversely affect the rate of drying of the average polymerized chloroprene cement.

A notable feature of the invention is that the emulsified water exerts no adverse effect upon the properties of the polymerized chloroprene in the adhesive composition. Thus, the keeping qualities or stability of the polymerized chloroprene dispersion are not inhibited. Furthermore, during the drying of the liquid composition after its application to a surface, the emulsified water, upon its dissipation or evaporation, does not observably decrease the tackiness or adhesiveness of the deposited polymerized chloroprene film. An illustrative example of a composition prepared in accordance with this invention is as follows:

| | |
|---|---|
| Plastic polymerized chloroprene (deodorized in the manner disclosed in Macdonald Patent 2,067,854) _____pounds__ | 8.5 |
| Chlorinated rubber (Tornesit—5 centipoise variety) _____pounds__ | 1.5 |
| Magnesium oxide (light) _____do____ | 0.4 |
| Zinc oxide _____do____ | 0.4 |
| Chlorinated rubber (Tornesit—1000 centipoise variety) _____pounds__ | 0.4 |
| Chlorinated rubber (Tornesit—20 centipoise variety) _____pounds__ | 0.4 |
| Ether _____gallons__ | 3.4 |
| "Solvesso #1" _____do____ | 3.4 |
| Toluene _____do____ | 0.7 |
| Water (14.2 pounds) _____do____ | 1.7 |
| Yield _____gallons__ | 10 |
| Viscosity of composition_____seconds__ | 11 |

The above composition conveniently may be prepared by separately dispersing the polymerized chloroprene, the zinc and magnesium oxides, and the water in separate portions of solvent, and then associating the separately prepared dispersions.

Thus, the polymerized chloroprene may be dispersed in a portion of the ether and "Solvesso #1" in a suitable mixing device such as a churn. The emulsion of water in an organic liquid of the aromatic hydrocarbon type may be prepared by introducing the water into a container provided with a high speed agitator and adding a substantially equal amount of toluene, and adding also the 5-centipoise variety of chlorinated rubber, which latter functions as an emulsifying agent. Upon agitation an emulsion of the water in the toluene is formed. The dispersion of the zinc and magnesium oxides may be prepared in a suitable mixing device such as a Werner & Pfeiderer mixer by introducing the 1000- and 20-centipoise varieties of chlorinated rubber, adding sufficient toluene to effect solution of chlorinated rubber, and then, with the mixer still in operation, gradually adding the zinc oxide and magnesium oxide to form a smooth and lump-free dispersion. The chlorinated rubber functions here to assist in holding the oxides in suspension.

The complete composition may be prepared by placing the polymerized chloroprene dispersion in a suitable mixing device and adding thereto the water emulsion and the oxides dispersion, as well as any additional solvent not previously incorporated, and stirring until a product of uniform consistency is obtained.

"Solvesso #1" is the proprietary name of a solvent, marketed by the Standard Oil Co. of New Jersey, which comprises about 73% aromatic hydrocarbons (mostly toluene) and about 27% of paraffin hydrocarbons (naphtha). The boiling range of Solvesso #1 is as follows: Initial boiling point 93° C.; 90% of the material boils at or below 119° C.; final boiling point 135° C.

"Tornesit" is the proprietary name of a chlorinated rubber, marketed by the Hercules Powder Company, which contains about 67% chlorine.

The viscosity of the illustrative composition, as given above, is referred to in terms of the seconds required for a steel ball of 9.5 millimeters (⅜ inch) diameter and weighing from 3.45 to 3.55 grams to drop 40 centimeters through a sample of the liquid adhesive maintained at 25° C. in a glass tube of 19 millimeters inside diameter.

The viscosity type of the Tornesit (chlorinated rubber) referred to herein is determined by measuring the viscosity in centipoises of a 20 per cent solution of the Tornesit in toluene.

In the above composition the polymerized chloroprene is of course the adhesive material. Preferably the polymerized chloroprene is malodorant-free, and may be prepared, for example, by deodorizing commercial plastic polymerized chloroprene in the manner set forth in Macdonald United States Letters Patent No. 2,067,854, or in Macdonald United States Letters Patent No. 2,107,796. The Tornesit (5-centipoise variety) functions as an emulsifying agent for the emulsification of water in the hydrocarbon solvent. The magnesium oxide serves, at least in part, to neutralize any hydrochloric acid which may be set free in the polymerized chloroprene. The zinc oxide appears to assist in the later curing or more complete polymerization of the plastic polymer after the composition has been used as an adhesive. The Tornesit (1000-centipoise and 20-centipoise varieties) assist in maintaining the zinc and magnesium oxides in suspension in the composition. The ether is a volatile diluent which aids in the rapid drying of the composition after application to a surface. The Solvesso #1 and toluene are solvents for polymerized chloroprene and the toluene also serves as the external phase of the water emulsion which is incorporated in the composition. The water, as hereinbefore at length explained, is the thickening agent, employed in the form of a water-in-oil emulsion.

It is to be understood that the above composition is given by way of specific example and that variations may be made therein. Thus, for example, compounding ingredients such as the zinc oxide and magnesium oxide may be omitted, or in some instances other or additional compounding ingredients might be employed. Furthermore, the oxides might be milled into the polymerized chloroprene prior to the dispersion of the polymer, in which case the use of the chlorinated rubber as a dispersing medium for such compounding ingredients might be dispensed with. When rapid drying is not desired, the ether may be omitted. Furthermore, other solvents for polymerized chloroprene, of a wide range of volatility, may be used in the composition, for example, benzene, trichloroethylene, carbon tetrachloride, xylene, propylene oxide. The invention, moreover, is not limited to polymerized chloroprene which is malodorant-free, and polymers of the malodorant type may be employed when such characteristic is not objectionable.

A form of polymerized chloroprene suitable for the purpose of this invention is the synthetic rubber-like material known commercially as neoprene and manufactured by E. I. du Pont de Nemours & Co., Inc. Such polymers may be made by polymerizing chloroprene in the manner set forth in Williams United States Letters Patent No. 1,950,436. The chloroprene itself may be made in the manner described in Carothers and Collins United States Letters Patent No. 1,950,431.

While the adhesive composition of this invention may be used for a variety of adhesive purposes, a useful application thereof is in the repair of shoes the outsoles of which originally were attached with polymerized chloroprene, such as in the manner disclosed in Wedger United States Letters Patent No. 2,061,296, and Wedger United States Letters Patent No. 2,087,878. Thus, in the replacement of outsoles which previously have been attached as described above the worn sole may be removed in any suitable manner. If necessary, the upper may be roughed and the attaching surface of the replacement sole also is roughed.

Liquid adhesive as disclosed herein may be applied by brush or other suitable means to the overlasted margin of the upper and to the flesh side of the roughened replacement sole. The adhesive then may be permitted to dry for a suitable period which generally is within the range of ½ hour to 2 hours. Following such suitable drying period, the replacement outsole and the upper may be brought into juxtaposition and placed under attaching pressure in a suitable press such as that known as the "Barge press." The parts to be joined may be maintained under sole-attaching pressure for any suitable time but generally speaking a period of from about 15 seconds to 2 minutes has been found to be entirely adequate.

Where the sole is relatively porous two applications of the cement may be required in order to provide an adequate film of cement on the surface. In such case the first coat of cement applied on the sole may be permitted to dry for about ¾ of an hour, a second coat applied and this also permitted to dry for approximately the same period. In such case, if the cement has been applied to the upper at the same time as the first coat of cement to the sole, it has been found that the cement on the upper is still in adhesive or tacky condition at the end of the period used in drying the two coats of cement on the sole. However, where it is known that two coats of cement are to be applied to the sole, the cement may be applied to the upper contemporaneously with the application of the second coat of cement to the sole. The use of the adhesive of this invention is not confined to any particular number of layers. As many layers may be applied as necessary in a given instance. Thus, two layers of cement may be applied to the upper and one layer to the sole or, in other instances, two layers may be applied to both the sole and the upper.

Having described our invention, what we claim as new and desire to secure by Letters Patent of the United States is:

1. A liquid adhesive composition comprising polymerized chloroprene dispersed in a solvent therefor, said composition containing emulsified water, and chlorinated rubber as an emulsifying agent for said water.

2. A liquid adhesive composition comprising polymerized chloroprene and compounding ingredients all dispersed in a solvent containing a substantial proportion of toluene, and a thickening agent comprising emulsified water, and chlorinated rubber as an emulsifying agent.

3. A polymerized chloroprene liquid adhesive composition characterized by a relatively low polymerized chloroprene content and by substantial viscosity, said composition comprising a colloidal dispersion wherein there are dispersed phases containing polymerized chloroprene and water, and wherein the continuous phase comprises an aromatic hydrocarbon solvent for polymerized chloroprene, chlorinated rubber being associated with said water as an emulsifying agent.

ALEXANDER D. MACDONALD.
JAMES H. RISHTON.